United States Patent [19]

Hawes

[11] 4,220,419
[45] Sep. 2, 1980

[54] CONNECTOR FOR WELDED CONTINUOUS BEAM STRUCTURES

[76] Inventors: William H. Hawes, 515 Clarkson St. #407, Denver, Colo. 80218

[21] Appl. No.: 40,159

[22] Filed: May 18, 1979

[51] Int. Cl.² .......................... F16B 7/00; F16L 41/00
[52] U.S. Cl. .................................... 403/189; 403/406
[58] Field of Search .............. 403/187, 188, 189, 266, 403/271, 272, 406

[56] References Cited

U.S. PATENT DOCUMENTS

| | | | |
|---|---|---|---|
| 1,824,631 | 9/1931 | Saxe | 403/271 X |
| 1,899,799 | 2/1933 | Edwards | 403/188 |
| 1,970,965 | 8/1934 | Leake | 403/188 |
| 2,641,829 | 6/1953 | Sasso | 403/271 X |
| 3,058,553 | 10/1962 | Hawes | 403/271 X |
| 3,938,297 | 2/1976 | Sato et al. | 403/189 X |
| 4,068,964 | 1/1978 | Stoker | 228/182 X |
| 4,111,578 | 9/1978 | Sato et al. | 403/189 |

FOREIGN PATENT DOCUMENTS

| | | | |
|---|---|---|---|
| 579428 | 6/1933 | Fed. Rep. of Germany | 403/272 |
| 1159155 | 12/1963 | Fed. Rep. of Germany | 403/187 |

*Primary Examiner*—Wayne L. Shedd
*Attorney, Agent, or Firm*—Edwin L. Spangler, Jr.

[57] ABSTRACT

This invention relates to an improved connector for continuous beam welded steel structures characterized by a step with a sloping riser formed at the juncture between the horizontal and vertical legs of a one piece generally L-shaped member, the aforesaid step defining a spacer effective to limit the approach of the bias cut end of a beam resting atop the horizontal leg thereof to one of a minimum spaced relation alongside the web of a girder or column. The sloping riser of this same step cooperates with the oppositely-sloped bias cut beam end to define a flared groove sized, located and shaped for the essentially vertical placement of a full penetration butt weld by means of a welding rod located in minimum spaced relation alongside the web of a girder or a column.

6 Claims, 3 Drawing Figures

CONNECTOR FOR WELDED CONTINUOUS BEAM STRUCTURES

Structural engineers have long recognized that there are certain advantages inherent in using the so-called "continuous beam" approach to beam and girder steel structures when compared to the more conventional "simple beam" concept where individual beams are bolted or otherwise fastened to bridge the spans between adjacent girders or columns. These advantages have to do primarily with the increased load-bearing capacity of the continuous beam as opposed to that of the simple one. With smaller beams being required for equivalent load-bearing capacity, the entire structure is lighter and less expensive to fabricate in terms of material costs. Unfortunately, while the advantages of the continuous beam are quite well known, they are seldom used because of the considerably greater difficulty associated with fabricating the continuous span connections. In other words, while the material costs are less, the labor costs can be much greater and result in an overall increased cost.

In my U.S. Pat. No. 3,058,553, I show a two-piece L-shaped connector for the same purpose as the one forming the subject matter hereof and which, at first glance, appears very similar structurally. Upon closer examination, however, they are very different from one another, both in the way they are made and in the way they are used. Most important, however, is the fact that my patented connector has not been nor could it, in fact, be used in the manner of the instant one piece unit. The truth of the matter is that my earlier connector has not been accepted in any significant way by the trade and in the material that follows I hope to explain why. To do so, however, requires a basic understanding of how continuous span steel structures are fabricated.

The tolerances in beam length are very tight and they seldom come from the mill in a form when they can be used without having to saw-cut not only one, but both ends. With this in mind, it is no more difficult to cut the beam ends on the bias than it is to cut them straight and this fact enters into the design and utility of the instant connector in a very significant way as will appear presently.

Another important factor is the relative cost of shop and field welds, the latter being far more expensive than the former and, for this reason, to be avoided whenever possible. Thus, any practical continuous span system must, if it is to be accepted, make maximum use of shop welding and keep the field welds to a minimum.

Perhaps the overriding consideration of all, however, is the ease with which the field welds can be made. If, as will appear presently, they are difficult to do, no matter how good the system is otherwise it will likely find little acceptance among structural engineers.

Bearing these things in mind, my patented connector and its manner of use should be assessed. Element 26 of my patented connector, first of all, constituted an extension of the lower beam flange bias cut at the proper angle to be shop welded thereto from a position tilted at an angle of a little over 20° to the adjacent beam end. In other words, element 26 of my patented connector was specifically designed and shaped to be shop welded to the lower beam flange from a position accessible beyond its then unobstructed end and sloping back at an angle thereto. Under no circumstance could this weld have been made in the field if this two-piece connector was preassembled as intended and shop welded to the web of the column or girder, for the simple reason that it would be impossible to get the welding rod into proper position with the girder or column web in the way. Thus, what at first impression appears to be a step 27 analogous to that of the instant invention acting as a spacer to maintain the beam end a predetermined minimum distance away from the girder or column web serves no such function when viewed in terms of the all important placement of the critical field weld 35 between the bias cut end 28 of this extension and the inside corner of the angle iron element 20 since this weld is placed behind rather than in front of upstanding lip 27.

Continuing with the analysis of the deficiencies inherent in my earlier two-piece connector the angle iron element 20 was, in fact, shop welded to the beam or column web in precisely the same manner as the one piece connector of the instant invention. While element 20 did include a spacer 23, it was less than a quarter of an inch wide (3/16 inch to be exact) and its sole function was to widen the base of the groove defined between sloping web extension surface 28 and the adjacent surface of the vertical connector leg 21 so as to maintain the proper dimensional relationship required for the butt weld. By the same token, spacer 23 was never intended to space the beam end far enough away from the girder web to allow the placement of a vertical full penetration butt weld at 35 nor was it possible to do so because of the space limitations.

Finally, from an engineering standpoint, it can be shown that the two spaced parallel welds 32 and 35 required in my earlier seat significantly increased the bending moment to which the horizontal leg of the connector assembly was subjected when compared with that of the instant invention by an increment closely approximating the distance separating the two welds. This increase in the bending moment is, by no means, inconsequential; in fact, its significance is so great that my two-piece patented connector is impractical which, because of this and some of the other reasons already mentioned, probably explains why it has not been used to any appreciable degree. The improved connector of the present invention, among other things, includes an integrally-formed step in the bend of the angle formed between its perpendicular legs with a sloping riser leading down to the ledge on the horizontal leg. The width of this step as well as the aforementioned slope in its riser overcome many of the objectionable features found in the prior art connectors including my own. While seemingly simple, its improved features are nonetheless unobvious and they make the difference between a connector which is both fast and easy to use as well as dependable and one that is so unhandy that it, together with the entire continuous beam concept, are abandoned in favor of the conventional simple beam one.

It is, therefore, the principal object of the present invention to provide a novel and improved one piece connector for use between girders or columns and the beams of continuous beam-type steel structures.

A second objective is the provision of a connector of the character described that greatly facilitates making the full penetration butt welds required to meet American Institute of Steel Construction specifications.

Another object is the provision of a step-cut connector which moves the situs of the full penetration corner weld out away from the girder or column web far enough to admit the welding rod perpendicularly while, at the same time, preserving the structural integrity and strength of the joint.

Still another object of the within described connector is that of providing a precision prefabricated unit which when used in combination with a beam end bias cut to the proper slope cooperates therewith to define a wide-bottomed upwardly-flared groove of the precise shape and dimensions required for the full penetration butt weld required to interconnect the beam end and web of the girder or column together to produce a continuous beam structural steel assembly.

An additional object of the invention herein disclosed and claimed is to provide a connector which so relates physically to the beam and web of the supporting member that all the required field welds are simply and easily formed.

Further objects are to provide a connector for continuous beam steel structures that is versatile, dependable, rugged, compact and even somewhat decorative.

Other objects will be in part apparent and in part pointed out specifically hereinafter in connection with the description of the drawings that follows, and in which.

Figure 1:
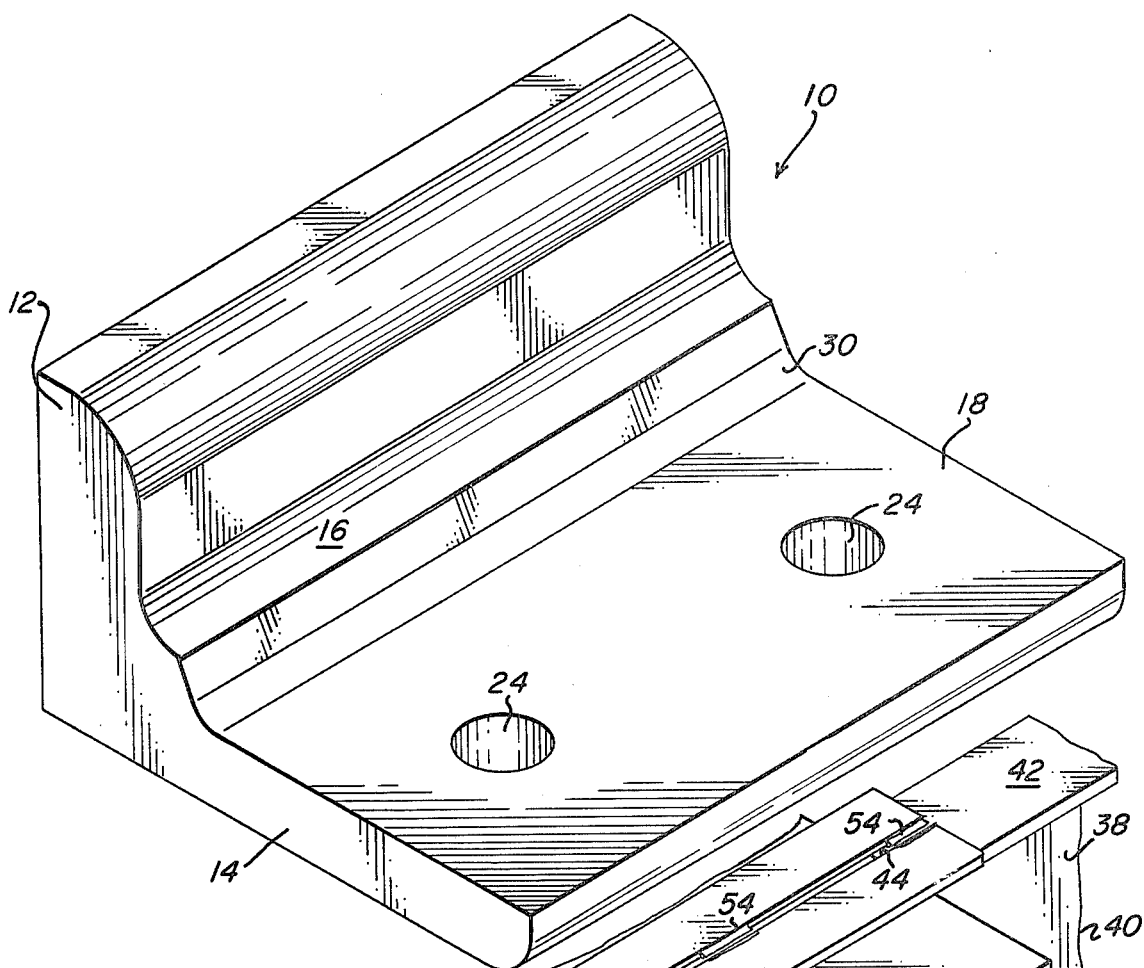
FIG. 1 is a perspective view showing the improved connector by itself.

Referring next to the drawings for a detailed description of the present invention and, initially, to FIG. 1 for this purpose, reference numeral 10 has been chosen to broadly designate the connector forming the subject matter hereof and it will be seen to comprise a one piece metal member having a vertical leg 12, a horizontal leg 14 and a step 16 formed in the angle therebetween. In the particular form illustrated, horizontal leg 14 is longer than vertical leg 12 and its upper planar surface 18 defines a ledge to support the bottom flange 20 (FIGS. 2 and 3) of a beam 22. This horizontal leg 14 contains a pair of apertures 24 to receive the bolts 26 which fasten the beam and connector together. Flange 20 of the beam is provided with an aperture 28 that registers with openings 24 in the connector.

The most important single feature found in the improved connector forming the subject matter hereof is the step 14 and more particularly, its inclined face or riser 30. This riser is sloped at an angle of approximately 15° and as can best be seen in FIG. 3 to which detailed reference will now be made, it cooperates with the oppositely-inlined bias cut end 32 of beam 22 when spaced slightly therefrom to define an upwardly-flared groove 34 for the insertion of a full penetration butt weld 36. The groove 34 thus formed is spaced up to approximately two inches from the web 38 of girder 40 or, alternatively, the corresponding part of a column, thus providing the welder with ample room alongside this web and underneath upper girder flange 42 for his hand, the handpiece or electrode of the welder, its electrical cables and the welding rod itself when held in spaced parallel relation to the web. This clearance is needed to make the full penetration butt weld in groove 34 from a position directly overhead. Also, and most significant, by shaping groove 34 to receive a vertically-deposited weld, the latter can be run continuously in the field from one end of this groove to the other through the V-shaped gap 44 defined between the bias cut beam end 32 and the web 38 of the girder or column. The juxtaposed end of beam 22 is bias cut on a 12:3 slope so as to cooperate with the oppositely-inclined surface 30 of step 16 to produce a groove 34 having an overall flare of 30° that meets the requirements of the American Welding Society's "Structural Welding Code" for so-called "prequalified butt welds."

Step 16 also acts as a spacer to insure that the bias cut end 32 of beam 22 remains a predetermined minimum fixed distance away from girder web 38 thus leaving a sizeable gap 44 therebetween, through which the welder can run a continuous weld from a position on one side or the other of the beam web. In the case of I-beam columns as contrasted to girders where the flanges lie alongside the web, gap 44 becomes even more critical to the placement of the weld with the welding rod held in parallel relation to the web since the column flanges noticeably interfere with this operation.

Figure 2:
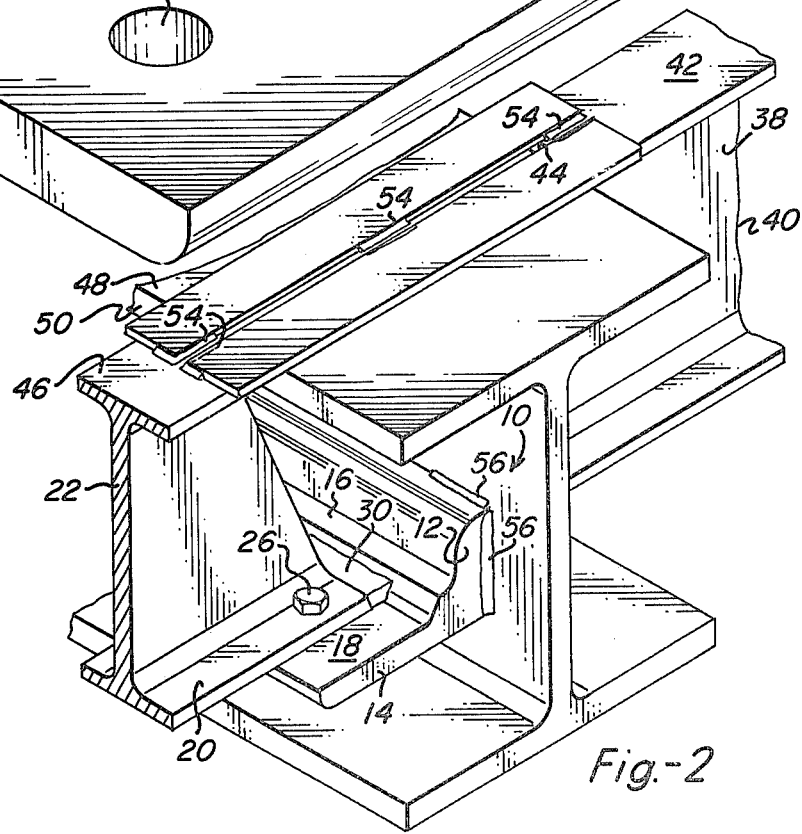
FIG. 2 is a fragmentary perspective to a reduced scale showing the connector in place within a continuous mid-span beam and girder steel structure; and, FIG. 3 is a view partly in section and partly in elevation showing the assembly of FIG. 2 to a scale slightly larger than the latter figure but smaller than FIG. 1.
Figure 3:
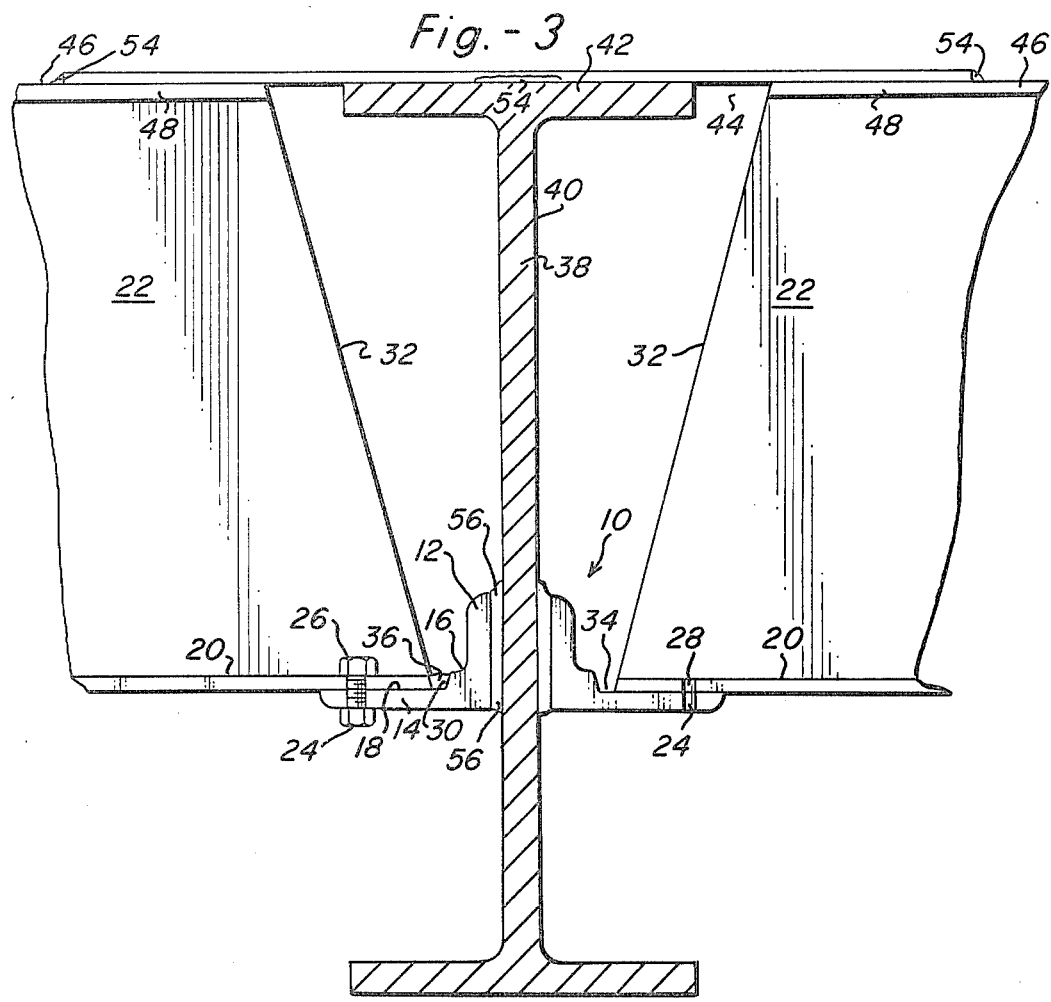

Finally with reference to FIGS. 2 and 3, it will be seen that the vertical leg 12 of the connector is welded to the web 38 of the girder or column in position such that with the bottom flange 20 of the beam resting atop upwardly-facing surface 18 of the horizontal leg 14, the top surface 46 of the beam's top flange 42 will be essentially flush with respect to the top surface 48 of the upper girder flange 50. This is standard construction and it accommodates bridge plates 52 which span gap 44 and are welded as indicated at 54 to both upper flanges.

Welds 56 attaching the vertical leg of the connector to the web 38 of the girder or column are confined as shown to the top and sides thereof with no weld being made along the bottom. All of these welds can be made quite simply and easily especially since they are made in the shop before the girder is delivered to the job site. By so doing, it is only necessary to insert bolts 26, make full penetration butt weld 36 and the bridge plate welds 54 on the job, all of the latter being simple and very accessible to the welder from a position seated atop the girder or beam as the case may be. Moreover, cutting away of the top beam flange (coping) to accommodate the girder flange is done away with due to the spacing of the bias cut end 32 farther from the girder web by reason of step 12.

The thickness of horizontal leg 14 on connector 10 is minimal thus enabling beams to be used which closely approach the girder in overall depth. The vertical leg of the connector acts as a back-up plate to reinforce the web of the girder. Also, the length of the connector is preferably greater than the width of the beam flanges so as to project therebeyond and provide additional support therefor.

What is claimed is:

1. In a one piece generally L-shaped connector for attachment to the web of an I-beam support between the marginal flanges bordering same as a means for attaching the bias cut end of a relatively shallower I-beam thereto in perpendicular relation, a pair of legs disposed in substantially right angled relation to one another with a longitudinally-extending step formed in the right angle therebetween, one of said legs having a flat surface on a face thereof remote from said right angle while the other of said legs has a flat surface on a face thereof adjacent said right angle, said remote flat surface including side margins and a free edge atop thereof for welding to the vertically-disposed web an I-beam support when said surface is placed in face-to-face upstanding relation thereagainst, and said adjacent flat surface when arranged horizontally at the base of the step defining an upwardly-facing ledge adapted to support the bottom flange of a relatively shallower I-beam with a bias cut end laid atop thereof, and said step defining a spacer effective to maintain the bias cut end of the second of said I-beams a predetermined minimum fixed distance away from said vertically-disposed web of the first to leave a gap sized to permit uninterrupted vertical placement of a full penetration butt weld between said second beam and connector at the base of said step.

2. The connector as set forth in claim 1 wherein: the step includes a downwardly and outwardly inclined face adapted to cooperate with the bias cut end of the I-beam when laid in juxtaposed relation thereto to define an upwardly-flaring groove for the placement of the butt weld, said groove having inclined walls sloping in opposite directions with respect to the vertical.

3. The connector as set forth in claim 1 wherein the flange containing the adjacent flat surface is apertured to receive bolts for attaching same to the lower flange of the I-beam.

4. The connector as set forth in claim 2 wherein walls of the groove diverge upwardly at an angle of approximately 30°.

5. The connector as set forth in claim 2 wherein the inclined face is inclined at an angle of approximately 15° to the remote flange face.

6. The connector as set forth in claim 2 wherein the gap between the bias cut end of the I-beam and web of the I-beam support is not less than approximately two inches.

* * * * *